(12) United States Patent
Abushawashi et al.

(10) Patent No.: US 11,738,631 B2
(45) Date of Patent: Aug. 29, 2023

(54) VEHICLE FRAME CROSS MEMBERS WITH BUCKLING AVOIDANCE FEATURES

(71) Applicant: FORD GLOBAL TECHNOLOGIES, LLC, Dearborn, MI (US)

(72) Inventors: Yalla Mussa Abushawashi, Canton, MI (US); Marwan Ahmad Elbkaily, Canton, MI (US); Muhsin M. Hamdoon, Windsor (CA); Alexander Morgan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 17/105,129

(22) Filed: Nov. 25, 2020

(65) Prior Publication Data

US 2022/0161646 A1     May 26, 2022

(51) Int. Cl.
*B60K 1/04* (2019.01)
*B60K 15/03* (2006.01)
*B62D 21/02* (2006.01)
*B62D 21/15* (2006.01)

(52) U.S. Cl.
CPC ............... *B60K 1/04* (2013.01); *B60K 15/03* (2013.01); *B62D 21/02* (2013.01); *B62D 21/157* (2013.01)

(58) Field of Classification Search
CPC .. B60K 1/04; B60K 15/03; B60K 2001/0405; B60K 2001/0411; B60K 2001/0416; B62D 21/02; B62D 21/157; B62D 21/00; B62D 21/03; B62D 21/07; B62D 21/15; B62D 21/152; B62D 21/155
See application file for complete search history.

(56) References Cited

U.S. PATENT DOCUMENTS

| | | | |
|---|---|---|---|
| 5,823,287 A | 10/1998 | Chidamparam et al. | |
| 6,962,390 B1 | 11/2005 | Myers et al. | |
| 9,022,152 B2 | 5/2015 | Imamura et al. | |
| 2002/0170766 A1 | 11/2002 | Gantz et al. | |
| 2019/0275876 A1* | 9/2019 | Fukui | B60K 1/04 |
| 2019/0344829 A1 | 11/2019 | Abushawashi et al. | |

FOREIGN PATENT DOCUMENTS

| | | |
|---|---|---|
| CN | 109292007 | 2/2019 |
| EP | 2487090 | 8/2012 |

\* cited by examiner

*Primary Examiner* — Jacob M Amick
(74) *Attorney, Agent, or Firm* — Lorne Forsythe; Hanley, Flight & Zimmerman LLC

(57) ABSTRACT

Vehicle frames with buckling avoidance features are disclosed. An example apparatus includes a cross member extending between a first side rail and a second side rail, a battery coupled to the cross member and the second side rail, and a bracket opposite to the battery, the bracket coupled to the first side rail and the cross member at a first location and a second location.

20 Claims, 10 Drawing Sheets

VEHICLE FRAME CROSS MEMBERS WITH BUCKLING AVOIDANCE FEATURES

FIELD OF THE DISCLOSURE

This disclosure relates generally to vehicle structures and, more particularly, to vehicle frame cross members with buckling avoidance features.

BACKGROUND

A vehicle frame, also referred to as a chassis, is the main supporting structure of a vehicle. Vehicle frames can be body-on-frame constructions, where the body of the vehicle is separate from the frame, or unibody constructions, where the frame and the body are integrated. The vehicle frame supports mechanical components of the vehicle and manages the static and dynamic loads on the vehicle (e.g., the weight of passengers and cargo, torsional twisting due to uneven road surfaces, torque from a vehicle engine and/or transmission, etc.).

SUMMARY

An example apparatus disclosed herein includes a cross member extending between a first side rail and a second side rail, a battery coupled to the cross member and the second side rail, and a bracket opposite to the battery, the bracket coupled to the first side rail and the cross member at a first location and a second location.

An example vehicle disclosed herein includes a frame including a first side rail, a second side rail, a cross member extending between the first side rail and the second side rail, a structural member coupled to the first side rail, and the cross member at a first location and a second location, the structural member coupled to the first side rail, and a battery opposite the structural member.

Figure 1:
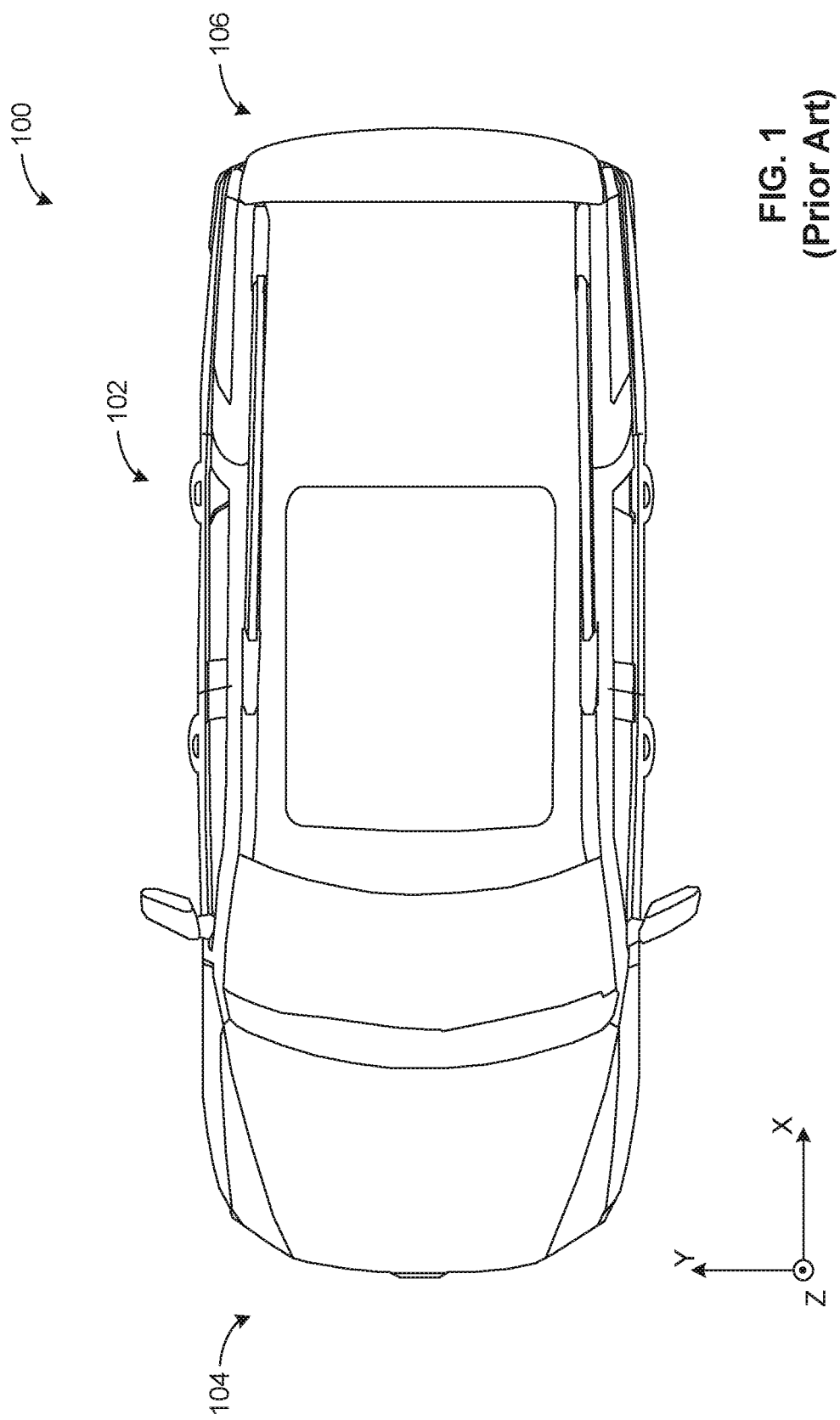
FIG. 1 is a top view of a vehicle in which the teachings of this disclosure can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., section, linkage, area, region, or plate, etc.) is in any way on (e.g., positioned on, located on, disposed on, disposed about, or formed on, etc.) another part, indicates that the referenced part is either in contact with the other part, or that the referenced part is above the other part with one or more intermediate part(s) located therebetween. Connection references (e.g., attached, coupled, connected, joined, etc.) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

DETAILED DESCRIPTION

In recent years, many vehicles that traditionally had internal combustion engines have been converted to fully electrified vehicles and/or partially electrified vehicles. In some examples, vehicle subsystems must be redesigned to accommodate electric vehicle (EV) components (e.g., batteries, power distribution units (PDU), electric motors, etc.). Particularly, in some examples, vehicle frames are redesigned to accommodate the additional space requirements of EV batteries. In some examples, the additional packaging requirements require the removal/rearrangement of some structural features of the frame, which can increase the likelihood of damage to critical vehicle features during impacts.

Examples disclosed herein include frame features that include buckling avoidance enablers during side impacts. Examples disclosed herein include an assembly with a cross member with portions of different strength and a bracket coupled thereto. Examples disclosed herein include cross members with relatively weak outer sections, which biases buckling towards the outer section of the cross member. In some examples disclosed herein, the inner section of the cross member has a greater wall thickness than the outer sections of the cross member. In some examples disclosed herein, the inner section of the cross member is composed of a relatively higher strength material than the material of the outer sections of the cross member. In some examples disclosed herein, the comparatively weaker portions of the cross member are configured to absorb kinetic energy during impacts, inelastically deform (e.g., buckle, etc.), and ensure the inner section of the cross member does not buckle. In some examples disclosed herein, a structural bracket is coupled to the variably strength cross member and a side rail of the vehicle.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the orientation of features is described with reference to a lateral axis, a vertical axis, and a longitudinal axis of the vehicle associated with the features. As used herein, the longitudinal axis of the vehicle is parallel to the centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively As used herein, the lateral axis of the vehicle is perpendicular to the longitudinal and vertical axes and is generally parallel to the axles of the vehicle. In general, the attached figures are annotated with a set of axes including the lateral axis (Y), the longitudinal axis (X), and the vertical axis (Z). As used herein, the terms "longitudinal" and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

In some examples used herein, the term "substantially" is used to describe a relationship between two parts that is within three degrees of the stated relationship (e.g., a substantially colinear relationship is within three degrees of being colinear, a substantially perpendicular relationship is within three degrees of being perpendicular, a substantially parallel relationship is within three degrees of being parallel, etc.). As used herein, "approximately" and "about" refer to dimensions that may not be exact due to manufacturing tolerances and/or other real-world imperfections.

FIG. 1 is a top view of an example vehicle 100 in which the teachings of this disclosure can be implemented. In the illustrated example of FIG. 1, the example vehicle 100 includes a prior art frame 102. The vehicle 100 includes an example vehicle front 104 and an example vehicle back 106.

The vehicle 100 is a motorized wheel-driven vehicle. In the illustrated example of FIG. 1, the vehicle 100 is a sport utility vehicle (SUV). In other examples, the vehicle 100 can be any type of wheeled vehicle (e.g., a sedan, a coupe, a van, a pick-up truck, a semi-trailer truck, an all-terrain vehicle (ATV), farming equipment, etc.). In some examples, the vehicle 100 is an EV. In such examples, the vehicle 100 includes one or more electric motors and one or more battery arrays. In other examples, the vehicle 100 includes an internal combustion engine (e.g., a non-electrified vehicle, a partially electrified vehicle, etc.).

The prior art frame 102 of the vehicle 100 supports the components of the vehicle 100 (e.g., the powertrain, an electric motor, the vehicle cabin, etc.). The prior art frame 102 is generally composed of longitudinal structural members (hereafter "side rails") and lateral structural members (hereafter "cross members"). The prior art frame 102 is described in greater detail below in conjunction with FIGS. 2A and 2B.

Figure 2A:
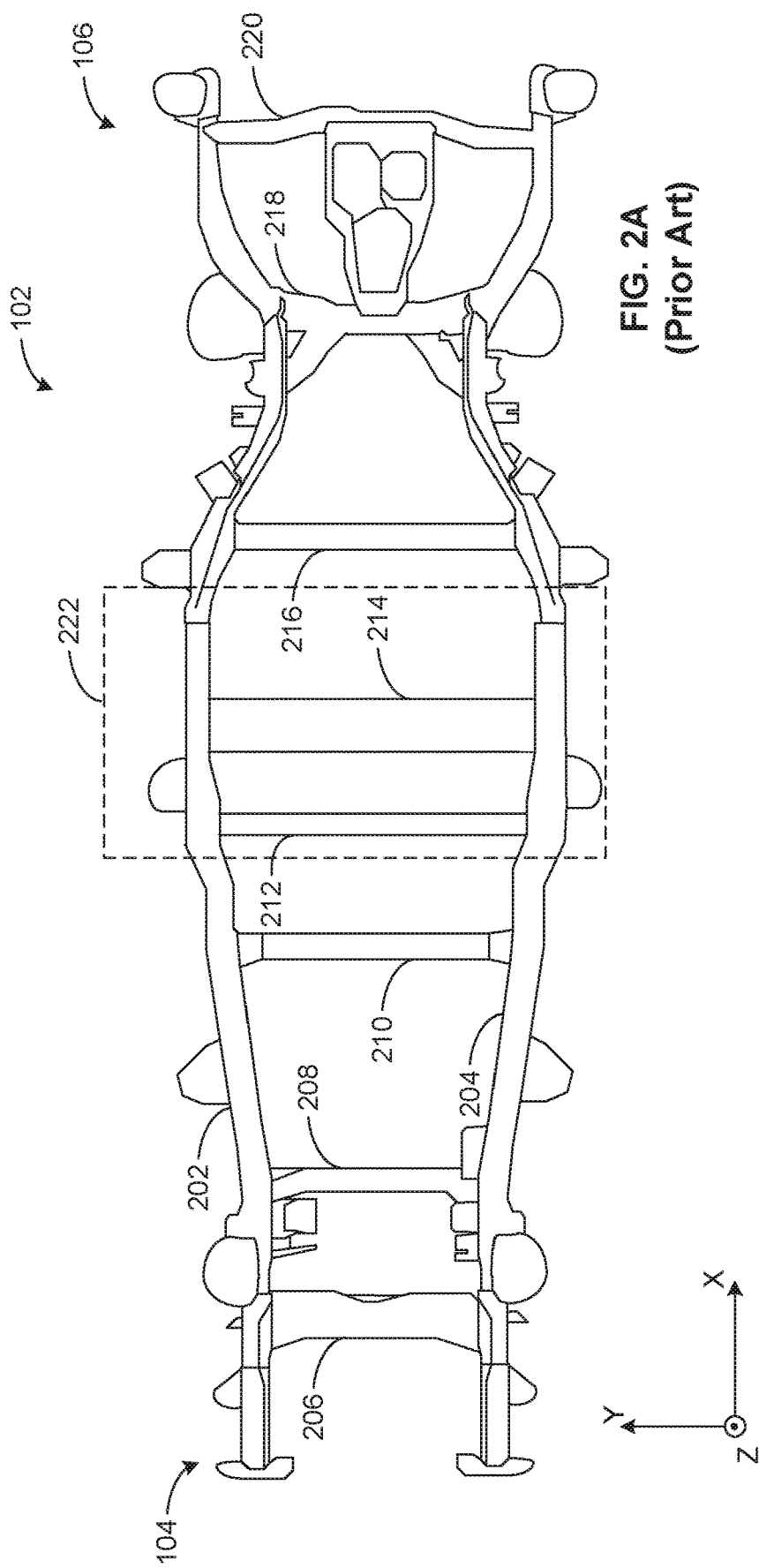
FIG. 2A is a top view of a prior art vehicle frame.

FIG. 2A is a top view of a prior art vehicle frame 102 of the vehicle 100. The prior art vehicle frame 102 includes a first side rail 202, a second side rail 204, a first cross member 206, a second cross member 208, a third cross member 210, a fourth cross member 212, a fifth cross member 214, a sixth cross member 216, a seventh cross member 218, and an eighth cross member 220. The side rails 202, 204 and the cross member 212, 214 define a region 222. In FIG. 2A, the prior art frame 102 is a ladder frame. The prior art frame 102 can be composed of steel, aluminum, and/or any other suitable materials or combination thereof.

The cross members 206, 208, 210, 212, 214, 216, 218, 220 extend generally laterally between the side rails 202, 204. The cross members 206, 208, 210, 212, 214, 216, 218, 220 increase the strength of the prior art vehicle frame 102 and enables vehicle components to be coupled in the center of the vehicle 100. Particularly, the cross members 206, 208, 210, 212, 214, 216, 218, 220 increase the resistance of the prior art frame 102 to lateral impacts (e.g., impacts perpendicular to the side rails 202, 204. The cross members 206, 208, 210, 212, 214, 216, 218, 220 can be composed of steel, aluminum, and/or any other suitable material(s). The cross members 206, 208, 210, 212, 214, 216, 218, 220 can be coupled to the side rails 202, 204 via fasteners (e.g., bolts, rivets, etc.), welds, press-fits, and/or any suitable combination of fasteners and/or fastener techniques.

Figure 2B:
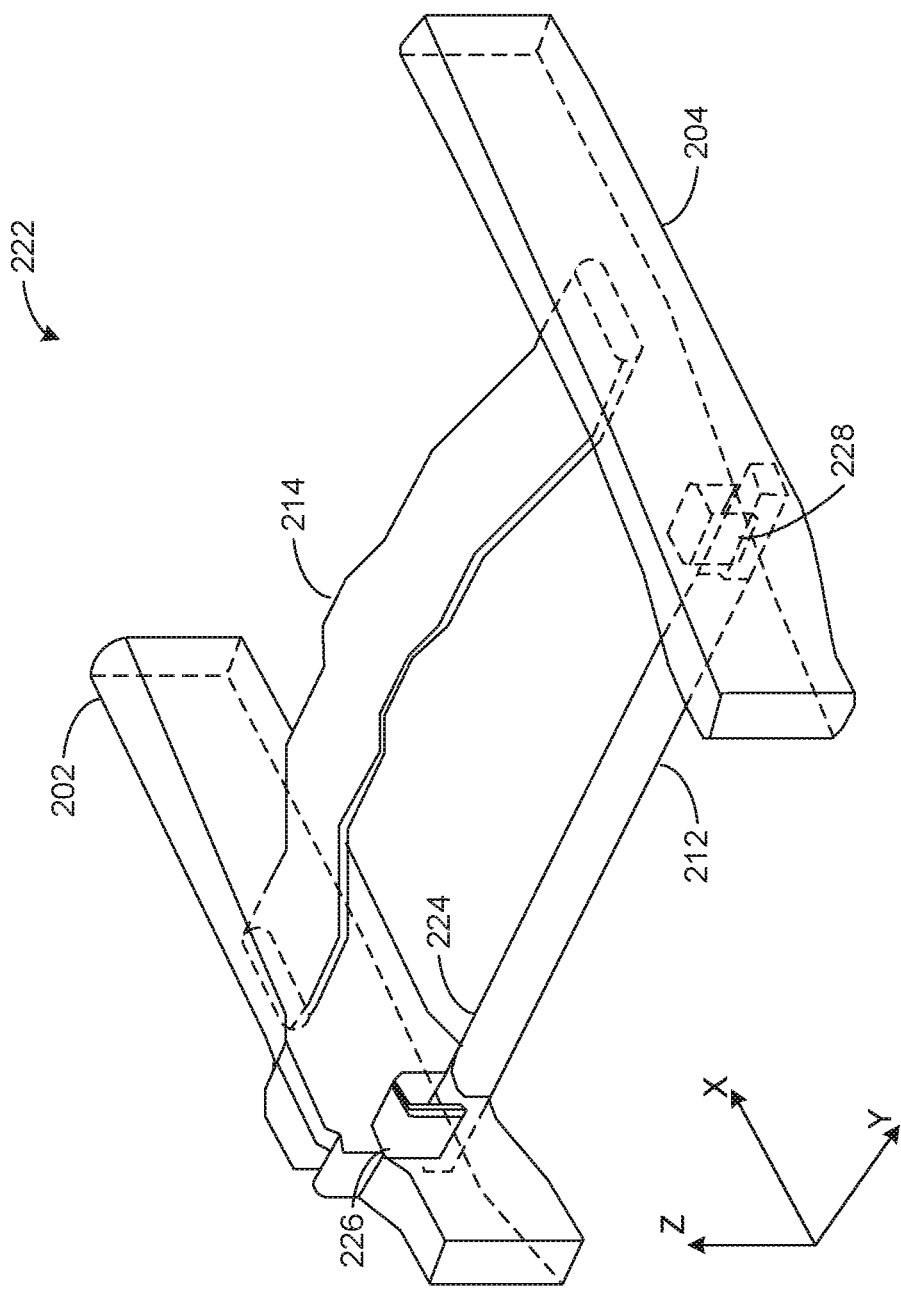
FIG. 2B is a perspective view of a portion of the prior art vehicle frame of FIG. 2.

FIG. 2B is a perspective view of the region 222 of the prior art vehicle frame 102 of FIG. 2. The region 222 includes the side rails 202, 204 and the cross members 212, 214. In FIG. 2B, the cross member 212 includes a doubler 224 and is coupled to the side rails 202, 204 via brackets 226, 228, respectively.

The brackets 226, 228 further couple the cross member 212 to the side rails 202, 204. The brackets 226, 228 provide additional structural support and further bias the bending zone of the cross member 212 towards the outer sections of the cross member 212. In the event of a side impact (e.g., an oblique pole side impact, etc.), the brackets 226, 228 bias the deformation of the cross member 212 such that cross member 212 is more likely to buckle near the ends of the cross member 212. The integrity of the middle of the cross member 212 is further reinforced by the doubler 224. The doubler 224 is a sleeve coupled (e.g., via a weld, etc.) to the exterior of the cross member 212. The doubler 224 increases the gauge of the cross member 212. As such, the brackets 226, 228 and doubler 224 inhibit the bending of the center of the cross member 212, which shifts the bending zones of the cross member 212 to the ends of the cross member. By shifting the bending zones to the ends of the cross member 212, the vehicle components in the center of the frame are protected from damage caused by side impacts. The cross member 214 further increases the lateral impact strength of the prior art frame 102.

The following examples refer to a vehicle frame implemented in accordance with the teachings of this disclosure, similar to the prior art vehicle frame of FIGS. 2A and 2B unless noted otherwise. When the same element number is used in connection with FIGS. 3A-5C, it has the same meaning unless indicated otherwise.

Figure 3A:
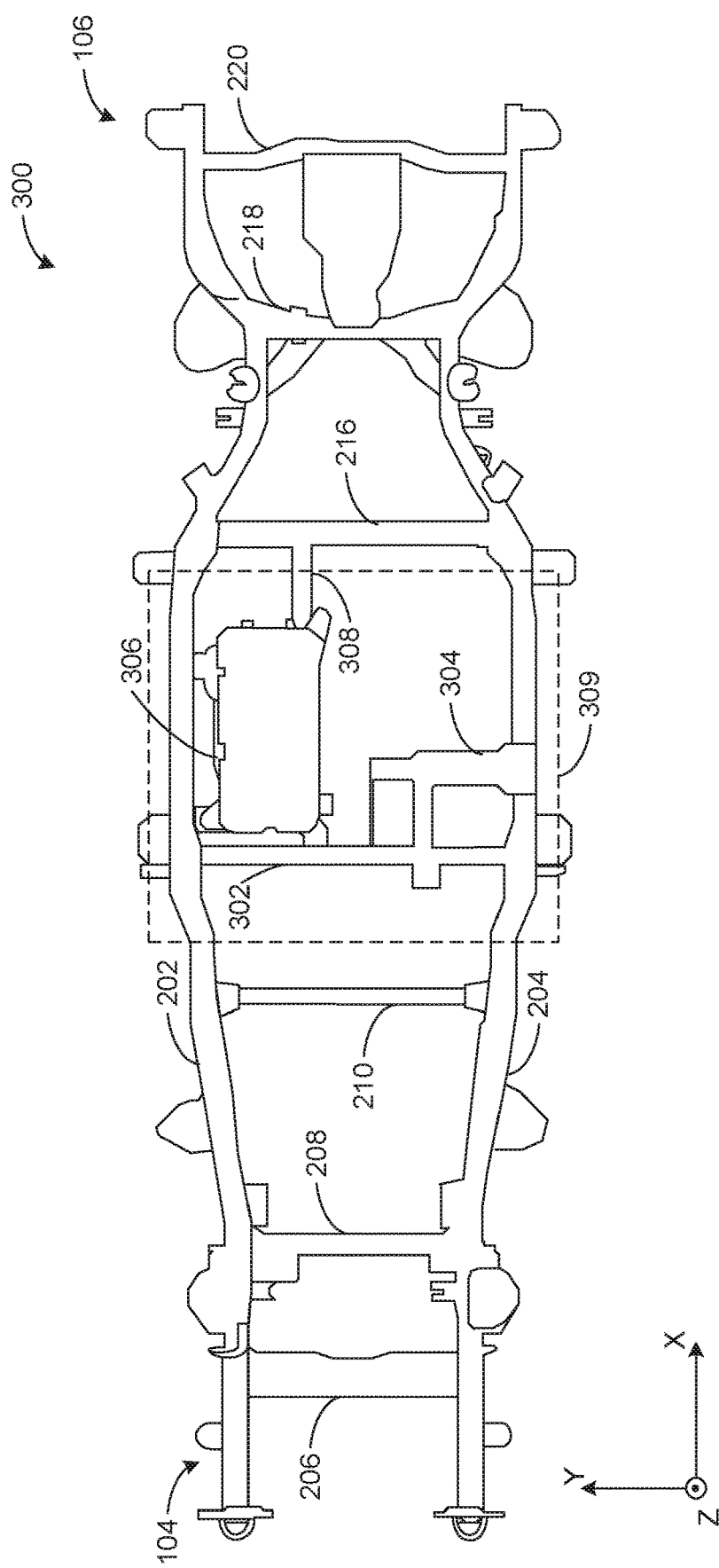
FIG. 3A is a top view of a vehicle frame implemented in accordance with the teachings of this disclosure.

FIG. 3A is a top view of an example vehicle frame 300 implemented in accordance with the teachings of this disclosure. The vehicle frame 300 includes the side rails 202, 204 and the cross members 206, 208, 210, 216, 218, 220. In the illustrated example of FIG. 3A, the vehicle frame 300 includes an example ninth cross member 302, an example bracket 304, and an example battery 306. The example battery 306 is coupled to the sixth cross member 216 via an example coupling 308. The side rails 202, 204 and the cross member 302, 216 define an example region 309.

The vehicle frame 300 is configured to be coupled in the vehicle 100 of FIG. 1. Particularly, the vehicle frame 300, like the prior art frame 102, is a ladder frame composed, generally, of the cross members 206, 208, 210, 216, 218, 220, 302 and the side rails 202, 204. In the illustrated example of FIG. 3A, the frame 300 does not include a cross member in the same position as the cross member 214 of the prior art frame 102. In the illustrated example of FIG. 3A, the area corresponding to the prior art cross member 214 of FIG. 2A is partly occupied by the bracket 304 and battery 306.

The cross member 302 is a lateral member that extends between the example side rails 202, 204. The cross member 302 replaces (e.g., is disposed in a corresponding location of, etc.) the cross member 212 of the prior art frame 102 of 2A-2B. The example cross member 302 is described in greater detail below in conjunction with FIGS. 3B and 4. The bracket 304 is a structural member that reinforces the frame 300. In the illustrated example of FIG. 3A, the bracket 304 replaces (e.g., is disposed in a corresponding location of, etc.) the cross member 214 of the prior art frame 102 of FIGS. 2A-2B, etc. In the illustrated example of FIG. 3A, the bracket 304 is coupled to the second rail 204 and the example cross member 302. The bracket 304 is described in greater detail in conjunction with FIGS. 3B-5C.

The battery 306 is an EV battery. In the illustrated example of FIG. 3A, the battery 306 is coupled to the first cross member 302, the first side rail 202 and the cross member 216, via the coupling 308. In other examples, the battery 306 can be coupled to the frame 300 at any other suitable locations. In the illustrated example of FIG. 3A, the battery 306 is a hybrid EV battery. In such examples, power stored in the battery 306 supplements the power generated by a combustion engine of the vehicle 100. In other examples, the battery 306 can be a battery for a fully electrified vehicle. The example battery 306 can have any other suitable configuration. While in the illustrated example of FIGS. 3A and 3B, the battery 306 is depicted as a single unit, in other examples, the battery 306 can be implemented as an array of batteries and/or multiple batteries. In some examples, additional batteries can be coupled to the frame 300.

Figure 3B:
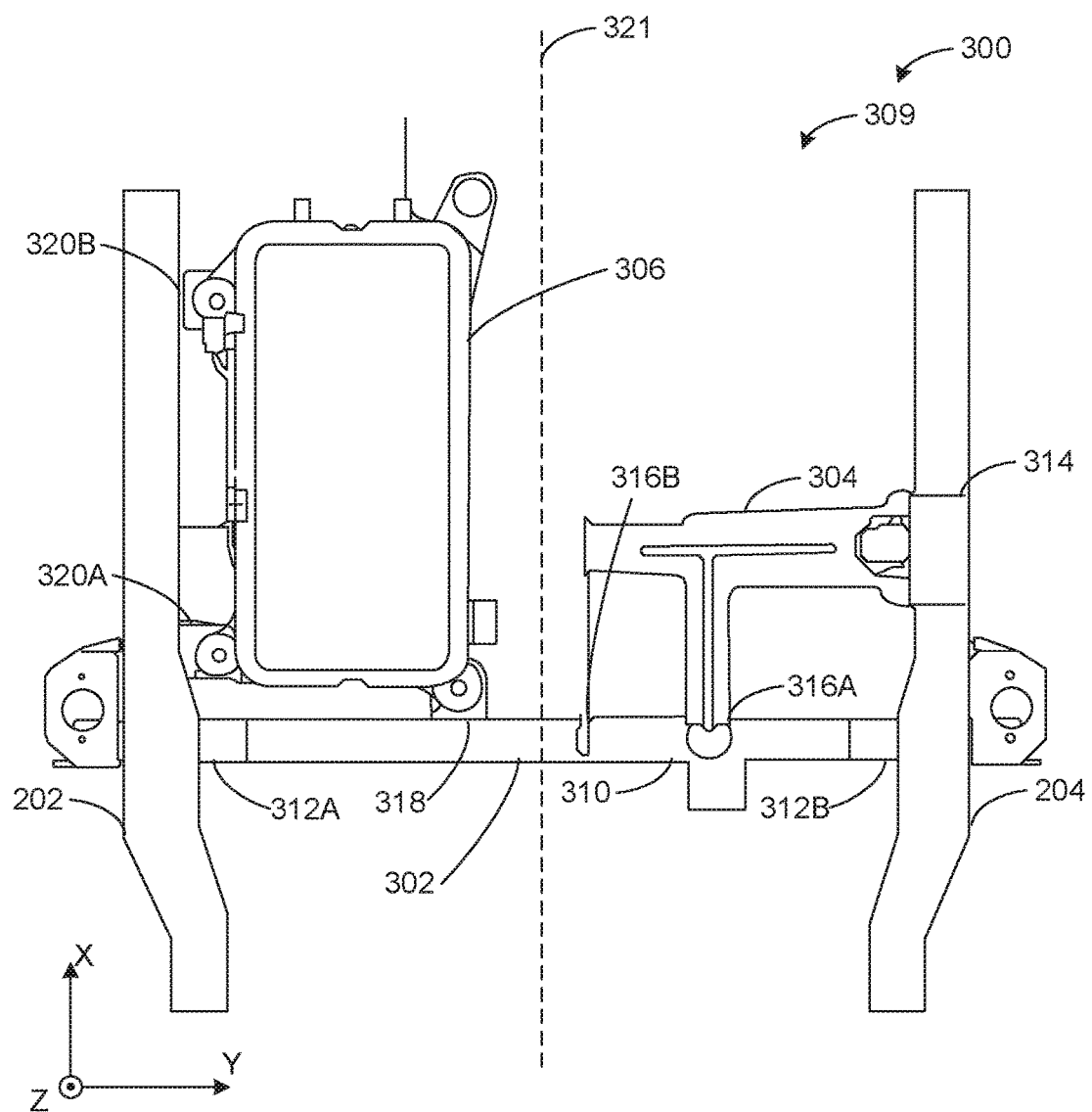
FIG. 3B is a top view of a portion of the vehicle frame of FIG. 3A.

FIG. 3B is a top view of the example region 309 of the vehicle frame 300 of FIG. 3A. The example region 309 contains a portion of the side rails 202, 204, the example cross member 302, the example bracket 304, and the example battery 306. In the illustrated example of FIG. 3B, the cross member 302 includes an example inner portion 310, an example first outer portion 312A, and an example second outer section 312B. In the illustrated example of FIG. 3B, the bracket 304 is coupled to the side rail via a first coupling 314 and is coupled to the cross member 302 via an example second coupling 316A and an example third coupling 316B. In the illustrated example of FIG. 3B, the battery 306 is coupled to the cross member 302 via an example fourth coupling 318 and is coupled to the side rail 202 via an example fifth coupling 320A and an example sixth coupling 320B. In the illustrated example of FIG. 3B, the vehicle frame 300 defines an example centerline 321, which is the lateral center of the vehicle frame 300.

In the illustrated example of FIGS. 3A and 3B, the outer portions 312A, 312B extend through the side rails 202, 204, respectively. In the illustrated example of FIG. 3B, the outer portions 312A, 312B of the cross member 302 have a lower resistance to buckling than the inner portion 310. For example, the outer portions 312A, 312B can have a lower wall thickness (e.g., gauge, etc.) than the inner portion 310. In such examples, the greater wall thickness of the inner portion 310 creates a buckling zone in the outer portions 312A, 312B. Additionally or alternatively, the outer portions 312A, 312B can be composed of a comparatively weaker material (e.g., a material with a lower Young's modulus, a material with a lower compressive strength, a material with lower resistance to buckling, etc.) than the inner portion 310. For example, the inner portion 310 can be composed of a high-strength low-alloy (HSLA) steel with higher strength than the HSLA steel of the outer portions 312A, 312B. In other examples, the outer portions 312A, 312B can be composed of a type of steel with a lower carbon content than the steel of the inner portion 310. In other examples, the portions 310, 312A, 312B can be composed of any other suitable materials (e.g., materials that prevent galvanic corrosion, etc.). In such examples, the higher strength of the inner portion 310 creates a buckling zone in the outer portions 312A, 312B.

In the illustrated example of FIG. 3B, the bracket 304 is coupled to the side rail 204 via a first coupling 314 and is coupled to the cross member 302 via the second coupling 316A and the third coupling 316B. In the illustrated example of FIG. 3B, the third coupling 316B is located on the driver side of a vehicle centerline 321. In other examples, the coupling 316B can be disposed at any other suitable location on the cross member 302 (e.g., on the centerline 321, the driver side of the cross member 302, etc.). In some examples, the bracket 304 is configured to abut a fuel tank of the vehicle 100 (e.g., the vehicle 100 is a hybrid vehicle, the vehicle 100 is a conventional combustion engine based automobile, etc.). In some examples, the couplings 314, 316A, 316B are implemented via welds. In other examples, the couplings 314, 316A, 316B can be implemented via any fastening technique, device (e.g., a fastener, a weld, a chemical adhesive, a press-fit, etc.) or combination thereof.

In the illustrated example of FIG. 3B, the battery 306 is coupled to the first side rail 202 at a first location via the first coupling 320A and at a second location via the second coupling 320B. The battery 306 is coupled to the inner portion 310 of the cross member 302. In the illustrated example of FIG. 3B, the fourth coupling 318 is disposed on the passenger side of the centerline 321 of the vehicle 100, opposite the third coupling 316B of the bracket 304. In other examples, the coupling 318 can be disposed at any other suitable location on the cross member 302 (e.g., on the centerline 321, the driver side of the cross member 302, etc.). The example couplings 318, 320A, 320B are implemented via welds. In other examples, the couplings 318, 320A, 320B can be implemented via any fastening technique, device (e.g., a fastener, a weld, a chemical adhesive, a press-fit, etc.) or combination thereof.

Figure 3C:
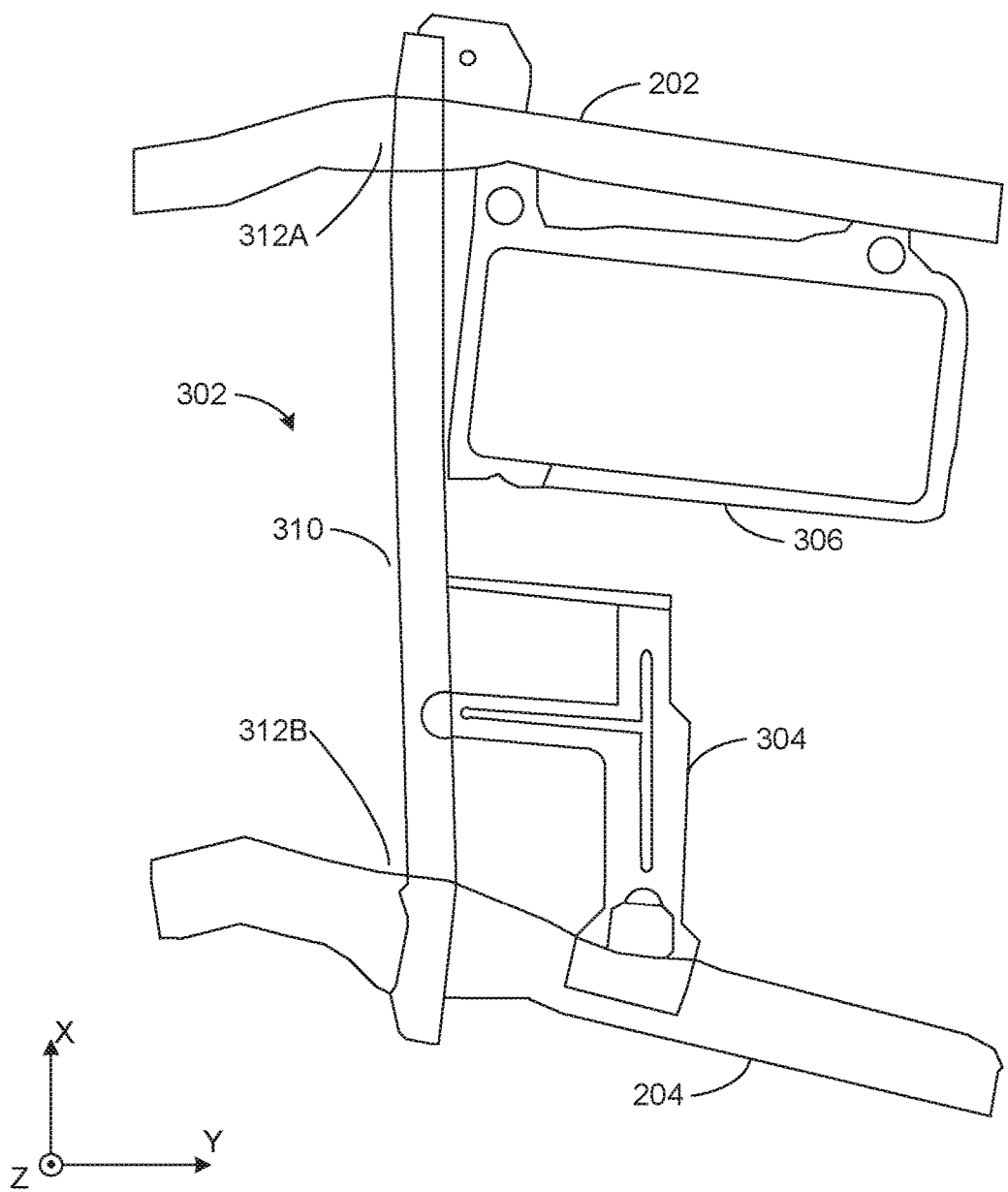
FIG. 3C is a top view of the portion of vehicle frame of FIG. 3B after a side impact.

FIG. 3C is a top view of the example region 309 of the vehicle frame 300 of FIGS. 3A and 3B after a side impact (e.g., an oblique pole side impact, etc.). In the illustrated example of FIG. 3C, the side rails 202, 204, crossmember 302, and bracket 304 have undergone inelastic deformation (e.g., plastic deformation, etc.) due to the impact. In the illustrated example of FIG. 3C, the comparatively lower strength of the outer portions 312A, 312B of the crossmember 302 caused them to inelastically deform to a greater extent than the inner portion 310 (e.g., the outer portions 312A, 312B of FIG. 3C have a greater strain than the inner portion 310, etc.). As such, the inelastic deformation and buckling of the comparatively stronger inner portion 310 is minimized. In some examples, if the portions 310, 312A, 312B were of equal strength, the inner portion 310 would undergo comparatively more inelastic deformation and buckling than the outer portions 312A, 312B. In the illustrated example of FIG. 3C, because the deformation and buckling of the inner portion 310 of the crossmember 302 is minimized, components in the lateral center of the vehicle frame 300 (e.g., the battery 306) are protected from direct impact damage.

Figure 4:
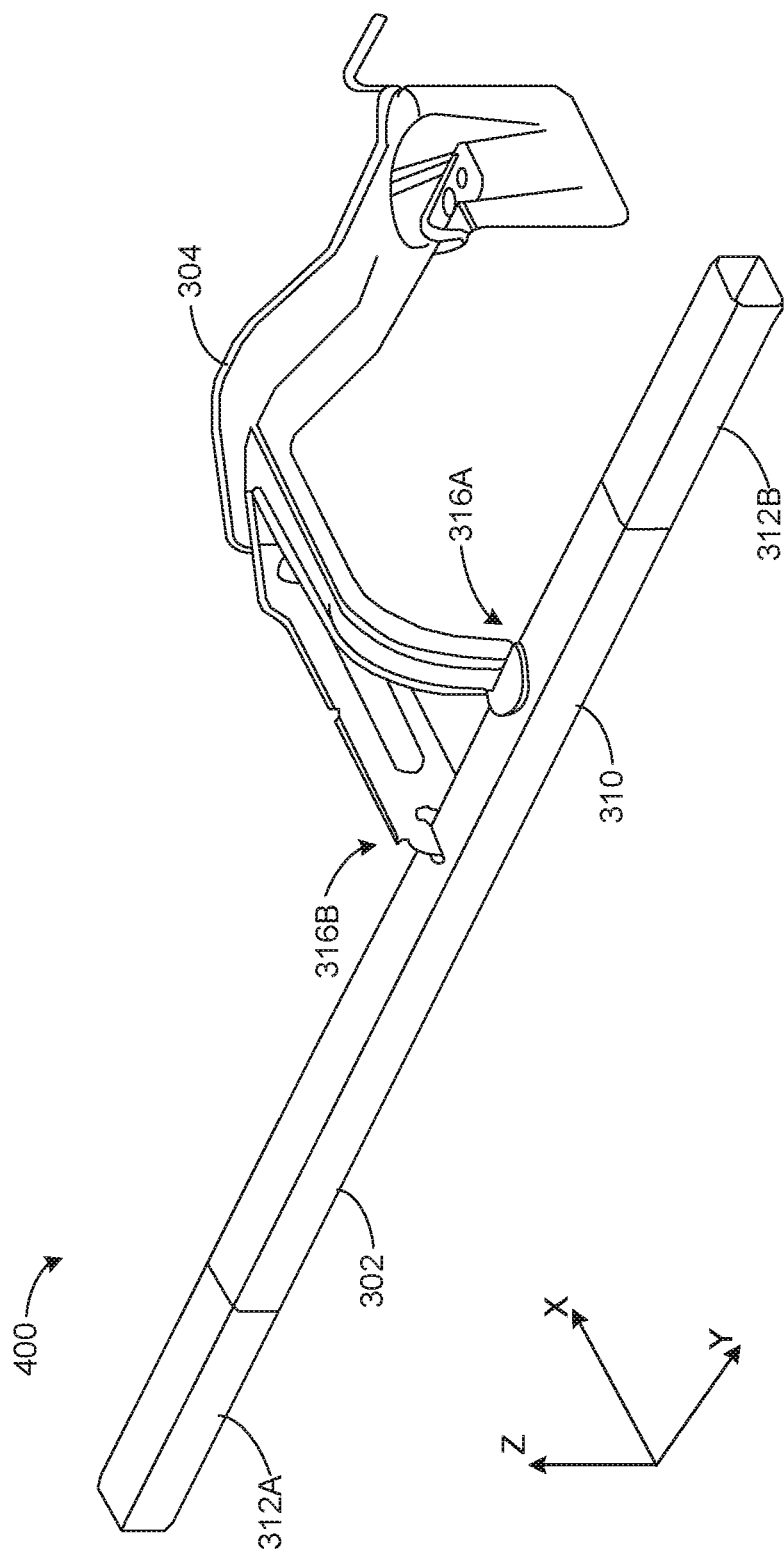
FIG. 4 is a perspective view of the cross member and the bracket of FIGS. 3A-3B.

FIG. 4 is a perspective view of cross member 302 and the bracket 304 of FIGS. 3A-3B. The cross member 302 and the bracket 304 form an example assembly 400, which replaces the cross members 212, 214 of the prior art frame 102 of FIGS. 2A and 2B. In the illustrated example of FIG. 4, the assembly 400 replaces the example prior art cross members 212, 214 of FIGS. 2A and 2B. In the illustrated example of FIG. 4, the assembly 400 is composed of fewer parts and weighs substantially less than components illustrated in FIG. 2 2B (e.g., the brackets 226, 228, the prior art cross members 212, 214, etc.). In some examples, the assembly 400 offers comparable (e.g., better, etc.) dynamic crash performance than the prior art cross members 212, 214. In the illustrated example of FIGS. 3A and 3B, the components of the assembly 400 are illustrated in the longitudinal center of the vehicle frame 300, the assembly 400 can be disposed at any suitable portion of the frame 300 (e.g., towards the front of the vehicle, towards the rear of the vehicle, in a subframe, etc.).

Figure 5A:
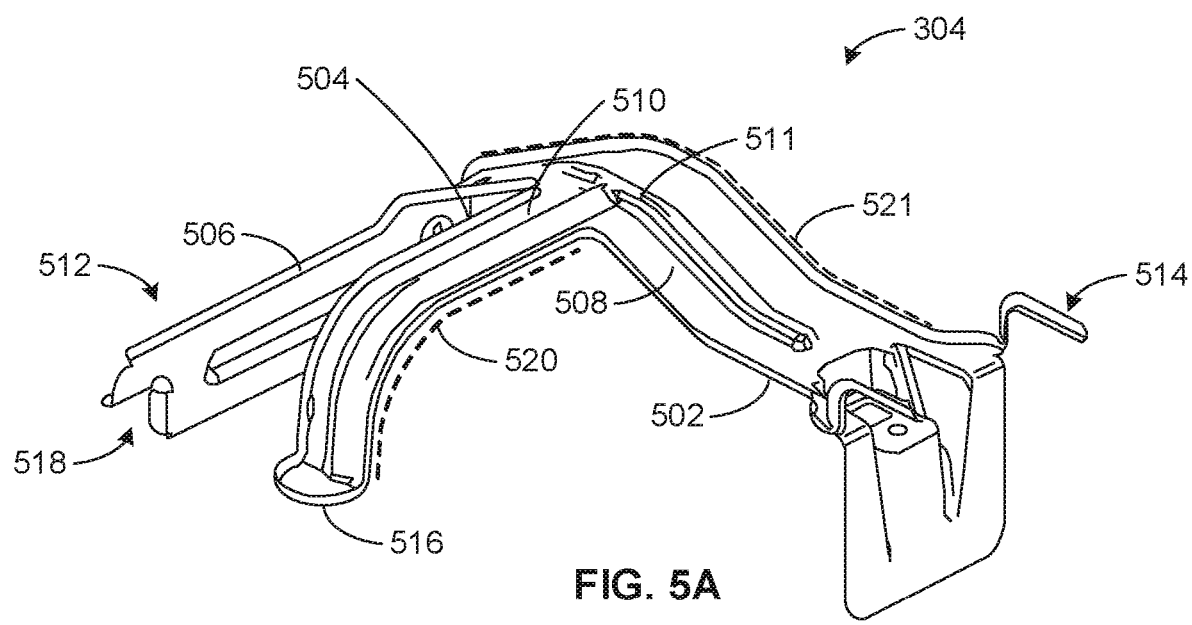
FIGS. 5A-5C are views of the bracket of FIGS. 3A-4.
Figure 5B:
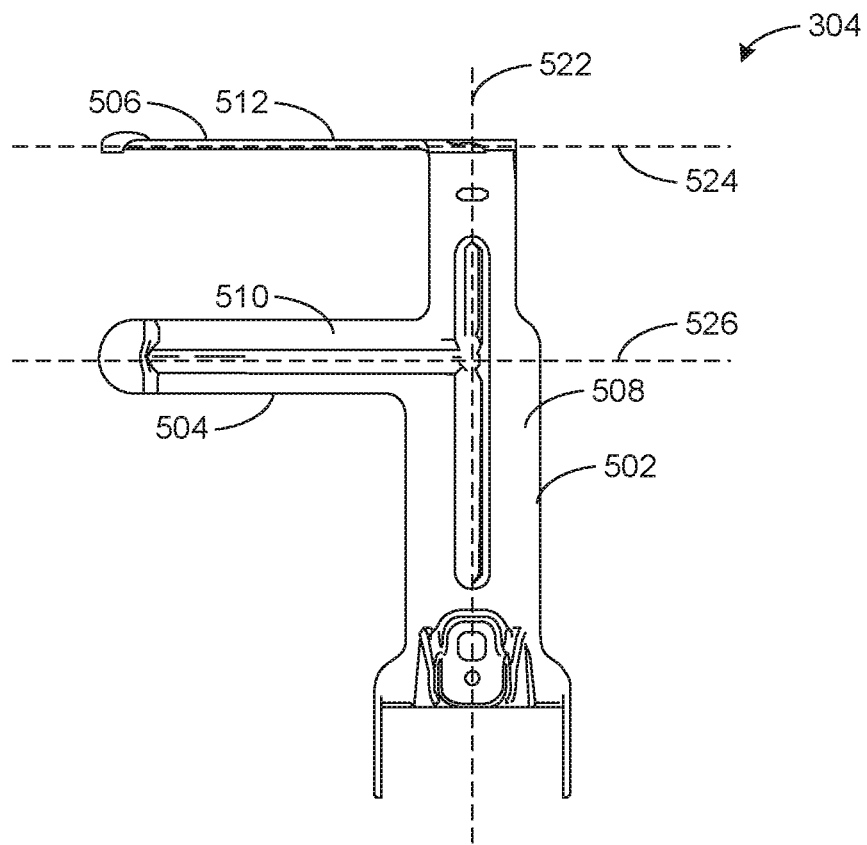
Figure 5C:
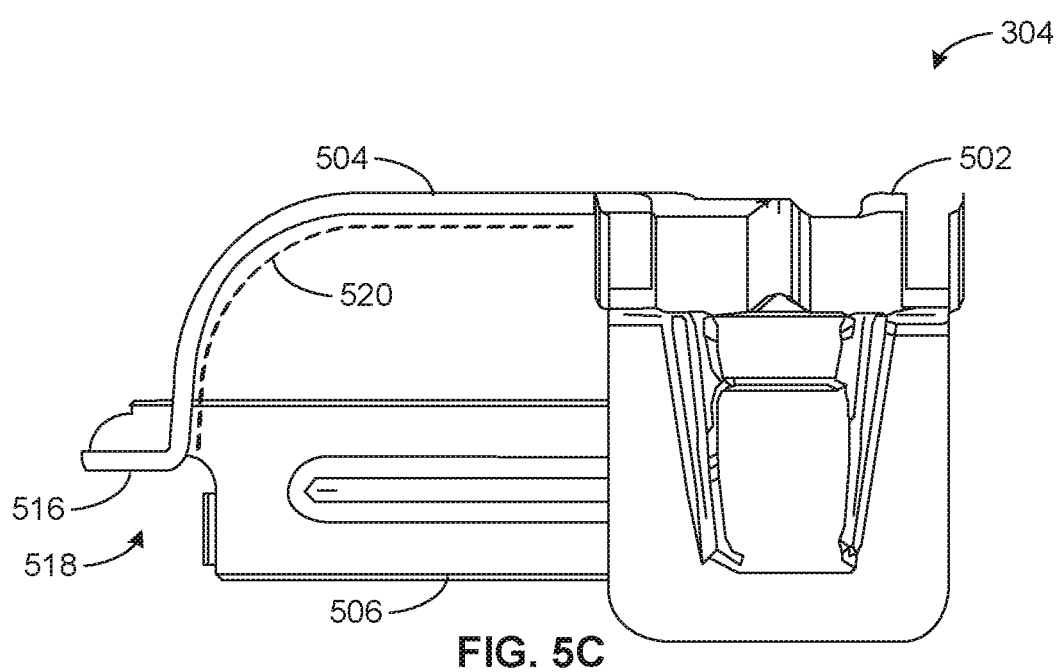

FIGS. 5A-5C are various views of the bracket 304 of FIGS. 3A-4. In the illustrated examples of FIGS. 5A-5C, the bracket 304 includes an example first portion 502, an example second portion 504, and the example third portion 506, which include an example first surface 508, an example second surface 510, and an example third surface 512, respectively. In the illustrated examples of FIGS. 5A-5C, the portions 502, 504, 506 include an example first mounting feature 514, an example second mounting feature 516, and an example third mounting feature 518, respectively. In the illustrated example of FIG. 5A, the second portion 504 defines an example profile 520. In the illustrated example of FIG. 5A, the first portion 502 defines an example second profile 521. In the illustrated example of FIG. 5B, the portions 502, 504, 506 define an example first axis 522, an example second axis 524, and an example third axis 526.

The portions 502, 504, 506 form the whole of the bracket 304. In the illustrated example of FIGS. 5A-5C, the portions 502, 504, 506 and the bracket 304, as a whole, are a unitary part (e.g., via a stamped/machined blank, manufactured via additive manufacturing, etc.). In other examples, the portions 502, 504, 506 are separate parts and are joined (e.g., via one or more fasteners, press-fits, welds, chemical adhesives, or combination thereof, etc.).

In the illustrated examples of FIGS. 5A-5C, the surfaces 508, 510, 512 are continuous (e.g., smooth, etc.). In other examples, the surface 508, 510, 512 can have discrete boundaries. The example surfaces 508, 510 are configured to abut and support a fuel tank of the vehicle 100 (e.g., the vehicle 100 is a hybrid, etc.). In the illustrated examples of FIGS. 5A-5C, a portion of the first surface 508 is substantially planar to a portion the second surface 510. In the illustrated example of FIGS. 5A-5C, the third surface 512 is perpendicular to a portion of the first surface 508 and a portion of the second surface 510. In the illustrated example of FIGS. 5A-5C, the surfaces 508, 510, 512 include an example outdented portion 511. In other examples, the outdented portion 511 can be absent.

In the illustrated examples of FIG. 5A-5C, the mounting features 514, 516, 518 are weld surfaces that can be used to form the couplings 314, 316A, 316B, respectively. Additionally or alternatively, some or all of the mounting features 514, 516, 518 can include other features that enable the bracket 304 to be coupled to the frame 300. For example, some or all of the mounting features 514, 516, 518 can include holes (e.g., bolt holes, threaded holes, etc.).

In the illustrated example of FIG. 5A, the first portion 502 has the first profile 520. In the illustrated example, the profile 520 includes a generally humped section corresponding to the second portion 504. That is, in the illustrated example of FIG. 5A, the first profile 520 slopes upward away from the first mounting feature 514 towards the second portion 504. In other examples, the portion of the profile 520 between the first mounting feature 514 and the second portion 504 is curved. The profile 520 is generally planar (e.g., flat, etc.) in the area corresponding to the second portion 504. The profile 520 slopes downward away from the second portion 504 towards the third portion 506. In other examples, the portion of the profile 520 between the second portion 504 and the third portion 506 can be curved. In other examples, the profile 520 can have any other suitable shape. For example, the profile 520 can be generally level (e.g., flat, in the x-y plane, etc.). In other examples, the profile can be generally "U"-shaped, "∩"-shaped, "V"-shaped, etc.

In the illustrated example of FIGS. 5A and 5B, the second portion 504 has the second profile 521. The second profile 521 includes a straight section adjacent the first portion 502 and a curved section adjacent the second mounting feature 516. In the illustrated example of FIGS. 5A and 5B, the curved section of the second profile 521 is an arc. In other examples, the curved section of the second profile 521 can have any other suitable curvature (e.g., polynomial, elliptical, etc.). In other examples, the profile 521 can have any other suitable shape (e.g., sloped, flat, stepped, etc.).

The axes 522, 524, 526 correspond to the portions 502, 504, 506, respectively. In the illustrated example of FIG. 5B, the axis 522 is substantially perpendicular to the axes 524, 526. In the illustrated example of FIG. 5B, the axes 524, 526 are substantially parallel. In other examples, the axes 522, 524, 526 can have any other suitable spatial orientation. For example, the axes 524, 526 can have a splayed orientation (e.g., divergent, extending towards opposite sides of the vehicle frame 300, etc.) or a convergent orientation (e.g., extending towards a central point, etc.). In some examples, the second axis 524 and the third axis 526 can intersect the first axis 522 at a non-orthogonal angle. In some examples, when the bracket 304 is coupled to frame 300, the first axis 522 is parallel to the cross members 206, 208, 216, 218, 220, 302 and the axes 524, 526 are parallel to the side rails 202, 204. In other examples, the axes 522, 524, 526 can have any other suitable spatial relationship with the other features of the frame 300.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Vehicle frames with buckling avoidance features are disclosed herein. Further examples and combinations thereof include the following:

Example 1 includes an apparatus comprising a cross member extending between a first side rail and a second side rail, a battery coupled to the cross member and the second side rail, and a bracket opposite to the battery, the bracket coupled to the first side rail and the cross member at a first location and a second location.

Example 2 includes the apparatus of example 1, wherein the cross member includes an inner portion, a first outer portion, and a second outer portion, the inner portion including the first location and the second location.

Example 3 includes the apparatus of example 2, wherein the inner portion has a first wall thickness and the first and second outer portions have a second wall thickness, the first wall thickness greater than the second wall thickness.

Example 4 includes the apparatus of example 2, wherein the inner portion includes a first material and the first and second outer portions include a second material, the first material having a greater resistance to buckling than the second material.

Example 5 includes the apparatus of example 1, wherein the bracket includes a first portion having a first axis substantially parallel to the cross member, a second portion having a second axis substantially parallel to the first side rail, and a third portion having a third axis substantially parallel to the first side rail.

Example 6 includes the apparatus of example 5, wherein the second portion is coupled to the cross member at the first location and the third portion is coupled to the cross member at the second location.

Example 7 includes the apparatus of example 5, wherein the first portion defines a first surface, the second portion defines a second surface, and the third portion defines a third surface, the second surface perpendicular to the third surface.

Example 8 includes the apparatus of example 7, wherein the first surface, the second surface, and the third surface are continuous.

Example 9 includes the apparatus of example 1, wherein the second location is substantially at a lateral center of the cross member and the first location is between the center of the cross member and the first side rail.

Example 10 includes the apparatus of example 9, wherein the battery is coupled to the cross member at a third location, the third location between the center of the cross member and the second side rail.

Example 11 includes a vehicle comprising a frame including a first side rail, a second side rail, a cross member extending between the first side rail and the second side rail, a structural member coupled to the first side rail, and the cross member at a first location and a second location, the structural member coupled to the first side rail, and a battery opposite the structural member.

Example 12 includes the vehicle of example 11, wherein the vehicle is a hybrid electric vehicle and the vehicle further includes a fuel tank abutting the structural member.

Example 13 includes the vehicle of example 11, wherein the cross member includes an inner portion, a first outer portion, and a second outer portion.

Example 14 includes the vehicle of example 13, wherein the first outer portion extends through the first side rail and the second outer portion extends through the second side rail.

Example 15 includes the vehicle of example 13, wherein the inner portion includes a first material and the first and second outer portions include a second material, the first material having a greater resistance to buckling than the second material.

Example 16 includes the vehicle of example 13, wherein the inner portion has a first wall thickness and the first and second outer portions have a second wall thickness, the first wall thickness higher than the second wall thickness.

Example 17 includes the vehicle of example 11, wherein the structural member includes a first portion having a first axis substantially parallel to the cross member, a second portion having a second axis substantially parallel to the first side rail, and a third portion having a third axis substantially parallel to the first side rail.

Example 18 includes the vehicle of example 17, wherein the second portion is coupled to the cross member at the first location and the third portion is coupled to the cross member at the second location.

Example 19 includes the vehicle of example 17, wherein the first portion defines a first surface, the second portion defines a second surface, and the third portion defines a third surface, the second surface perpendicular to the third surface.

Example 20 includes the vehicle of example 11, wherein the second location is a center of the cross member and the first location is between the center of the cross member and the first side rail.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    a cross member extending between a first side rail and a second side rail, the cross member including:
        an inner portion having a first wall thickness;
        a first outer portion; and
        a second outer portion, the first outer portion and the second outer portion having a second wall thickness, the first wall thickness greater than the second wall thickness;
    a battery coupled to the cross member and the second side rail; and
    a bracket opposite to the battery, the bracket coupled to the first side rail and the cross member at a first location and a second location.

2. The apparatus of claim 1, wherein the inner portion includes a first material and the first and second outer portions include a second material, the first material having a greater resistance to buckling than the second material.

3. The apparatus of claim 1, wherein the bracket includes:
a first portion having a first axis substantially parallel to the cross member;
a second portion having a second axis substantially parallel to the first side rail; and
a third portion having a third axis substantially parallel to the first side rail.

4. The apparatus of claim 3, wherein the second portion is coupled to the cross member at the first location and the third portion is coupled to the cross member at the second location.

5. The apparatus of claim 3, wherein the first portion defines a first surface, the second portion defines a second surface, and the third portion defines a third surface, the second surface perpendicular to the third surface.

6. The apparatus of claim 5, wherein the first surface, the second surface, and the third surface are continuous.

7. The apparatus of claim 1, wherein the second location is substantially at a lateral center of the cross member and the first location is between the lateral center of the cross member and the first side rail.

8. The apparatus of claim 7, wherein the battery is coupled to the cross member at a third location, the third location between the lateral center of the cross member and the second side rail.

9. A vehicle comprising:
a frame including:
a first side rail;
a second side rail;
a cross member extending between the first side rail and the second side rail; and
a structural member coupled to the first side rail, and the cross member at a first location and a second location, the structural member coupled to the first side rail;
a fuel tank abutting the structural member; and
a battery opposite the structural member, wherein the vehicle is a hybrid electric vehicle.

10. The vehicle of claim 9, wherein the cross member includes an inner portion, a first outer portion, and a second outer portion.

11. The vehicle of claim 10, wherein the first outer portion extends through the first side rail and the second outer portion extends through the second side rail.

12. The vehicle of claim 10, wherein the inner portion includes a first material and the first and second outer portions include a second material, the first material having a greater resistance to buckling than the second material.

13. The vehicle of claim 10, wherein the inner portion has a first wall thickness and at least one of the first outer portion or the second outer portion has a second wall thickness, the first wall thickness higher than the second wall thickness.

14. The vehicle of claim 9, wherein the structural member includes:
a first portion having a first axis substantially parallel to the cross member;
a second portion having a second axis substantially parallel to the first side rail; and
a third portion having a third axis substantially parallel to the first side rail.

15. The vehicle of claim 14, wherein the second portion is coupled to the cross member at the first location and the third portion is coupled to the cross member at the second location.

16. The vehicle of claim 14, wherein the first portion defines a first surface, the second portion defines a second surface, and the third portion defines a third surface, the second surface perpendicular to the third surface.

17. The vehicle of claim 9, wherein the second location is between a center of the cross member and the first side rail, and the first location is between the second location and the first side rail.

18. An apparatus comprising:
a cross member extending between a first side rail and a second side rail
a battery coupled to the cross member and the second side rail; and
a bracket opposite to the battery, the bracket coupled to the first side rail and the cross member at a first location and a second location, the second location between a lateral center of the cross member and the first side rail, the first location between the second location and the first side rail.

19. The apparatus of claim 18, wherein the cross member includes:
an inner portion having a first wall thickness;
a first outer portion; and
a second outer portion, at least one of the first outer portion and the second outer portion having a second wall thickness, the first wall thickness greater than the second wall thickness.

20. The apparatus of claim 19, wherein the first outer portion extends through the first side rail and the second outer portion extends through the second side rail.

* * * * *